(No Model.)
F. STICKEL.
CUT STONE FLOWER.
No. 357,425. Patented Feb. 8, 1887.
Fig. 1.
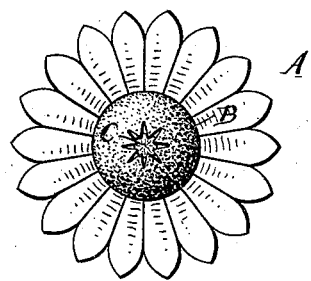
Fig. 2.
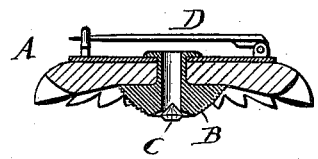
Fig. 3. Fig. 4. Fig. 6. Fig. 5.
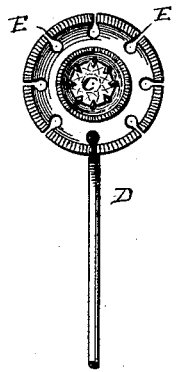 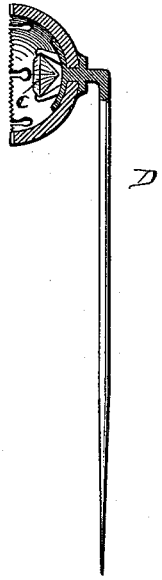  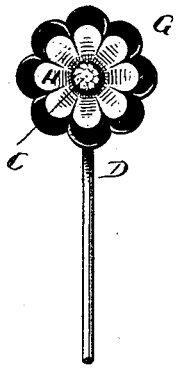
WITNESSES:
INVENTOR
Frederick Stickel
BY
Jacques Raegener
ATTORNEYS.

UNITED STATES PATENT OFFICE.

FREDERICK STICKEL, OF NEW YORK, N. Y.

CUT-STONE FLOWER.

SPECIFICATION forming part of Letters Patent No. 357,425, dated February 8, 1887.

Application filed June 1, 1886. Serial No. 203,870. (No model.)

*To all whom it may concern:*

Be it known that I, FREDERICK STICKEL, of the city, county, and State of New York, have invented certain new and useful Improvements in Articles of Jewelry, of which the following is a specification.

This invention relates to jewelry-ornaments made of valuable stones, such as agates, cameos, topaz, and similar stones.

The object of my invention is to provide a flower-ornament for jewelry purposes, which is highly ornamental, elegant in appearance, and durable.

The invention consists in the combination, with a stone having its face and contour cut in the shape of a flower, of a center-piece and a plate or backing to which the stone and center-piece are attached, as will be fully described hereinafter, and finally be pointed out in the claims.

In the accompanying drawings, Figure 1 is a front view of one of my improved cut-stone flowers. Fig. 2 is a cross-sectional view of the same. Fig. 3 is a front view of another shape of the cut-stone flower. Fig. 4 is a cross-section of the same. Fig. 5 is a front view of a cut-stone flower made of two pieces of stone, and Fig. 6 is a cross-section of the same.

Similar letters of reference indicate corresponding parts.

The flower A is made out of stone, such as agate, topaz, &c. The edges of the stone are cut to form scallops or toothed, or in any shape according to the contour of the flower to be imitated. The front surface of the stone is recessed more or less and grooved radially in representation of the ribs and edges of the leaves forming the flower or cut in any other suitable manner.

The center B of the flower is formed of gold, silver, metal, ivory, or other material, or of a piece of stone of the same or a different color, and, if desired, a gem, C, such as a diamond, ruby, emerald, amethyst, &c., may be fastened on the same. On the back of the stone flower a plate is fastened, to which is attached a needle, D, or pin of the usual construction.

In the flower shown in Figs. 1 and 2 the stone is cut to represent a daisy.

As shown in Figs. 3 and 4, the face of the stone may be hollowed out, and recesses E may be cut in the edge in representation of the subdivisions of the leaves of the flower. A gem, C, is also held in the middle of the cut-stone flowers.

As shown in Figs. 5 and 6, the flower may be formed of two cup-shaped stones, G H, one held within the other. The edges of the cup-shaped stone G in Figs. 5 and 6 are scalloped, and within the recess of the stone G a smaller stone, H, is placed and fastened thereto, the edges of which are also scalloped. The stones G and H may be of the same color or of different colors, the latter being preferred.

Any kind of a flower may be produced in stone, and very handsome effects may be produced by using different stones of different colors or stones of different shades or grades in the color.

The above-described cut stone flowers can be used on breast-pins, scarf-pins, rings, bracelets, ear-rings, and all other articles of jewelry.

Having thus described my invention, I claim as new and desire to secure by Letters Patent—

1. The combination, with a stone having its face and contour cut in imitation of a flower, of a center-piece and a plate or backing to which the cut stone and center-piece are attached, and to which backing a pin or analogous fastening device can be attached, substantially as shown and described.

2. The combination, with a stone having its contour and face cut in imitation of a flower, of an additional stone also having its face and contour cut in imitation of a flower and placed within the face, a plate or backing, and a connecting-piece for connecting both cut stones with said backing or plate, substantially as shown and described.

In testimony that I claim the foregoing as my invention I have signed my name in presence of two subscribing witnesses.

FRED. STICKEL.

Witnesses:
 OSCAR F. GUNZ,
 MARTIN PETRY.